L. S. CHICHESTER.
Machine for Preparing Flour.

No. 134,513.  Patented Jan. 7, 1873.

Witnesses  
Chas. H. Smith  
Geo. D. Walker

Inventor  
Lewis S. Chichester  
Lemuel W. Serrell  
att'y

UNITED STATES PATENT OFFICE.

LEWIS S. CHICHESTER, OF BROOKLYN, NEW YORK, ASSIGNOR TO CHARLES F. CHICHESTER, OF SAME PLACE.

IMPROVEMENT IN MACHINES FOR PREPARING FLOUR.

Specification forming part of Letters Patent No. 134,513, dated January 7, 1873.

*To all whom it may concern:*

Be it known that I, LEWIS S. CHICHESTER, of Brooklyn, Kings county, and State of New York, have invented an Improvement in Preparing Flour; and the following is declared to be a correct description thereof.

In grinding-mills the grain is rubbed between the surfaces of the stones and the hull broken into small pieces, and there is but little opportunity for air to aid in conveying the fine flour from between the stones.

My apparatus is made for comminuting the flour by separating the same from the hulls by concussion, that also breaks the particles of flour from each other by blows, instead of resorting to any rubbing or grinding operation. The current of air in the apparatus conveys away the flour as it becomes sufficiently fine. The action of the air and the beaters removes the flour from the hulls, so that they separate with great facility, and there is nothing of heat or friction in the operation to cause the flour to adhere to the bran, and the current of air prevents the flour being heated, as in the ordinary grinding operation.

Figure 2:
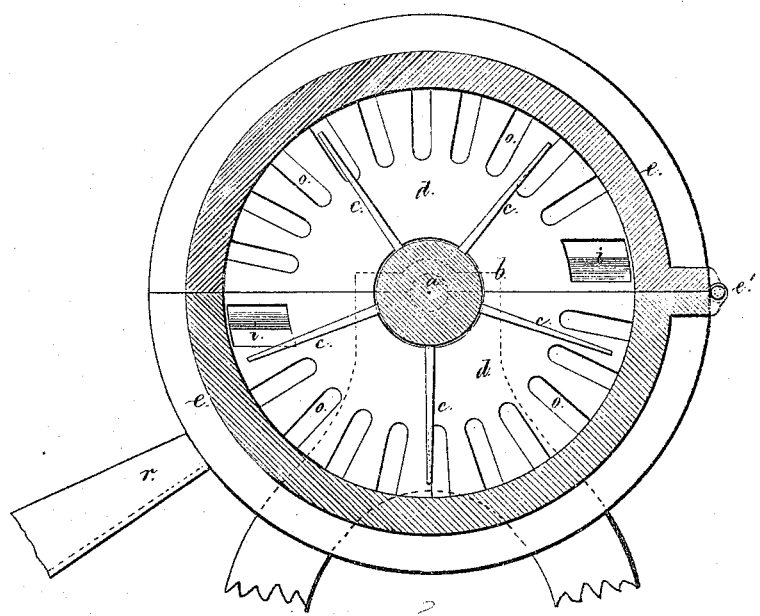
Figure 1:
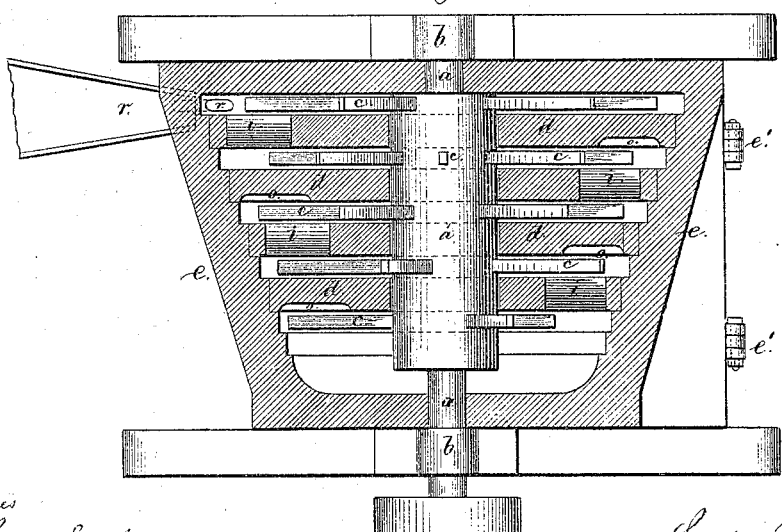

In the drawing, Figure 1 is a sectional plan of the separating apparatus, and Fig. 2 is a vertical section transversely to the shaft.

A shaft, $a$, is mounted in suitable bearings $b\ b$, and driven by competent power. Upon this shaft are beaters $c\ c$ projecting nearly radially and in any desired number, and these are arranged to revolve between the divisions $d\ d$ in the case $e$.

It is preferable that the case should be of a conical form, as shown, and that the beaters increase in length from the supply end toward the delivery end, and that the longer beaters should be the most flexible, so as to receive a tremulous motion in the act of revolving and striking the particles of flour and bran. These beaters are preferable when made of spring-steel, secured firmly by nuts or otherwise into the shaft or into a cylinder or ring surrounding the same.

The divisions $d\ d$ are made with openings $i$ from one space to the next, and also with depressions $o$ in the surfaces. The grain is supplied at $s$ by any suitable spout, and the flour and bran taken away from $r$ to a chamber or receptacle that retains the flour, but allows air to pass off. For this purpose bags or screens may be employed to retain the flour and allow the air to pass through.

The revolution of this shaft $a$ and its beaters produces a suction of air at the smaller end and a current of air through the case, and hence the particles of flour and bran will be conveyed off with the same, and the grain will be exposed to a series of blows from the beaters. The depressions $o$ will cause eddies or whirls in the air as the beaters pass by them, so that the particles will be thrown into the path of the beaters instead of being carried around by them.

The openings $i$ in the divisions $d$ are beveled toward the supply end of the apparatus, so that the beaters that revolve contiguous to the side that is not beveled may draw the air and flour through from one chamber to the next.

I have shown the case $e$ and divisions $d$ as divided at the central line of the shaft $a$, and at $e'$ the two parts of the case are hinged together, which allows of the upper section being raised to give access to the interior of the apparatus.

I claim as my invention—

1. A case with supply-chute near one end and a delivery-chute near the other end, in combination with a revolving horizontal shaft armed with ranges of flexible beaters and divisions placed within such case having openings to allow the material to pass from one range of beaters to the next, substantially as set forth.

2. The divisions $d\ d$ having depressions $o$ and openings or mouths $i$, as set forth, in combination with the ranges of beaters, as and for the purposes specified.

Signed by me this 11th day of April, 1872.

LEWIS S. CHICHESTER.

Witnesses:
GEO. D. WALKER,
GEO. T. PINCKNEY.